(12) United States Patent
Rahman et al.

(10) Patent No.: US 11,476,932 B2
(45) Date of Patent: Oct. 18, 2022

(54) QUANTUM TAMPERING THREAT MANAGEMENT

(71) Applicant: AT&T Intellectual Property I, L.P., Atlanta, GA (US)

(72) Inventors: Moshiur Rahman, Marlboro, NJ (US); Daniel Solero, Rockwall, TX (US); William Trost, Mequon, WI (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/107,828

(22) Filed: Nov. 30, 2020

(65) Prior Publication Data

US 2022/0173805 A1 Jun. 2, 2022

(51) Int. Cl.
*H04B 10/70* (2013.01)
*H04B 10/077* (2013.01)

(52) U.S. Cl.
CPC ..... *H04B 10/0771* (2013.01); *H04B 10/0773* (2013.01); *H04B 10/70* (2013.01)

(58) Field of Classification Search
None
See application file for complete search history.

(56) References Cited

U.S. PATENT DOCUMENTS

| | | | | |
|---|---|---|---|---|
| 6,002,501 | A * | 12/1999 | Smith | G01M 3/28 356/73.1 |
| 7,471,203 | B2 * | 12/2008 | Worthy | G08B 13/1445 340/556 |
| 8,885,828 | B2 * | 11/2014 | Wiseman | H04L 9/065 380/256 |
| 9,077,577 | B1 * | 7/2015 | Ashrafi | H04W 12/041 |
| 10,341,015 | B1 * | 7/2019 | Sarovar | H04B 10/70 |
| 2003/0007643 | A1 * | 1/2003 | Ben-Zur | H04N 7/162 348/E7.056 |
| 2007/0069893 | A1 * | 3/2007 | Anderson | G08B 13/186 340/541 |
| 2007/0230688 | A1 * | 10/2007 | Tajima | H04L 9/0891 380/30 |

(Continued)

OTHER PUBLICATIONS

Williams et al., A tamper-indicating quantum seal, 2016 (Year: 2016).*

(Continued)

*Primary Examiner* — Jai M Lee
(74) *Attorney, Agent, or Firm* — Hartman & Citrin LLC

(57) ABSTRACT

The concepts and technologies disclosed herein are directed to quantum tampering threat management. According to one aspect of the concepts and technologies disclosed herein, a quantum security manager ("Q-SM") can monitor a plurality of quantum channels for tampering. The Q-SM can detect tampering on a quantum channel of the plurality of quantum channels. The Q-SM can provide tampering monitoring statistics to a software-defined network ("SDN") that, in turn, notifies a quantum security operations center ("Q-SOC") about the tampering on the quantum channel. The Q-SM can receive threat mitigation instructions from the Q-SOC. The threat mitigation instructions can instruct the Q-SM how to counter the tampering on the quantum channel. The Q-SM can perform one or more actions in accordance with the threat mitigation instructions to counter the tampering on the quantum channel.

17 Claims, 6 Drawing Sheets

(56) References Cited

U.S. PATENT DOCUMENTS

| | | | |
|---|---|---|---|
| 2010/0265077 A1* | 10/2010 | Humble | G08B 13/124 |
| | | | 340/600 |
| 2010/0299526 A1* | 11/2010 | Wiseman | H04L 63/061 |
| | | | 713/171 |
| 2016/0226598 A1* | 8/2016 | Zhao | H04B 10/70 |
| 2020/0274697 A1* | 8/2020 | Ragan | H04L 9/083 |
| 2021/0044433 A1* | 2/2021 | Hay | H04L 9/0858 |
| 2021/0083866 A1* | 3/2021 | Bush | H04L 9/0852 |

OTHER PUBLICATIONS

Medhi, Von Neumann Architecture, 2012 (Year: 2012).*
Bisson et al., SECANT QKD Grand Challenge Sandia Enabled Communications and Authentication Network using Quantum Key Distribution, 2016 (Year: 2016).*
Hugues-Salas et al., Experimental Demonstration of DDoS Mitigation over a Quantum Key Distribution (QKD) Network Using Software Defined Networking (SDN), 2018, Optical Society of America (Year: 2018).*
Williams et al., "Tamper-Indicating Quantum Seal," Physical Review Applied, Jan. 4, 2016, vol. 5, Issue 1, American Physical Society.

* cited by examiner

QUANTUM TAMPERING THREAT MANAGEMENT

BACKGROUND

Classical or binary computers use bits to perform calculations. Over the past several decades computers have become more powerful and more efficient and can be used to solve a wide range of problems. Some of these problems, however, are so complex that even the most powerful classical computers require long processing times or are incapable of processing altogether. To address these problems, scientists have turned to quantum physics for answers. While binary computers are limited to two possible states for each bit (i.e., 0 or 1), a quantum computer uses quantum bits (also known as qubits) that can be in superposition, or in other words, multiple states simultaneously (i.e., both 0 and 1). As a simplified example, two classical bits can encode information in one of four possible states 00, 01, 10, or 11, but two qubits can encode a superposition of these states simultaneously. When a qubit state is measured, the measured value is out of superposition and represented as one of the two classical states.

Quantum computing has many applications. Currently, one of the most viable use cases is in telecommunications in the form of quantum communications. Quantum communication takes advantage of the laws of quantum physics to protect data. More specifically, photons of light transmitting data along optical cables can be in superposition. If a hacker attempts to tamper with the qubits in superposition, the qubits will fall out of superposition and resolve to a classical state of 0 or 1. As a result, the activity of the hacker is easily detected.

Conventional fiber-optic seals provide methods for monitoring enclosed inventories, but these seals are vulnerable to spoofing attacks based on classical physics. Scientists (e.g., in "Tamper-Indicating Quantum Seal;" Brian P. Williams, Keith A. Britt, and Travis S. Humble; Phys. Rev. Applied 5, 014001—Published 4 Jan. 2016; DOI: 10.1103/PhysRevApplied.5.014001) have addressed these vulnerabilities a few years ago with the development of a quantum seal that offers the ability to detect an intercept-resend attack using quantum integrity verification. That approach represents an application of entanglement to provide guarantees in the authenticity of the seal state by verifying that it is transmitted coherently. These ideas have been implemented by using polarization-entangled photon pairs that are verified after passing through a fiber-optic-channel infrastructure. Using a binary-detection theory, the scientists found that the probability of detecting inauthentic signals is greater than 0.9999 with a false alarm chance of 10-9 for a 10 second sampling interval. In addition, it has been shown how the Hong-Ou-Mandel effect concurrently provides a tight bound on redirection attack, in which tampering modifies the shape of the seal.

SUMMARY

Concepts and technologies disclosed herein are directed to quantum tampering threat management. According to one aspect of the concepts and technologies disclosed herein, a quantum security manager ("Q-SM") can monitor a plurality of quantum channels for tampering. The Q-SM can detect tampering on a quantum channel of the plurality of quantum channels. In some embodiments, the Q-SM can detect the tampering based upon a quantum seal tampering detection technique. The Q-SM can provide tampering monitoring statistics to a software-defined network ("SDN") that, in turn, notifies a quantum security operations center ("Q-SOC") about the tampering on the quantum channel. The Q-SM can receive threat mitigation instructions from the Q-SOC. The threat mitigation instructions can instruct the Q-SM how to counter the tampering on the quantum channel. The Q-SM can perform one or more actions in accordance with the threat mitigation instructions to counter the tampering on the quantum channel.

The Q-SOC can receive a notification from the SDN. The notification informs the Q-SOC about the tampering on the quantum channel. The notification can identify the quantum channel, including identification of the quantum nodes involved, the type of tampering (if known; e.g., eavesdropping), the location of the tampering, the type of data potentially compromised, and/or any other information that can be used to identify the quantum channel and/or the circumstances surrounding the tampering thereof. The Q-SOC can determine the threat mitigation instructions to counter the tampering on the quantum channel. The Q-SOC can then provide the threat mitigation instructions to the Q-SM.

In some embodiments, the Q-SOC can determine the threat mitigation instructions to counter the tampering on the quantum channel based upon one or more rules. The rule(s) can be specific to one or more of the plurality of quantum channels. The rule(s) can be specific to one or more of quantum nodes involved in the tampered quantum channel. The rule(s) can be specific to a time of day, a location, a data type, a type of tampering, or the like. The rule(s) may consider any combination of the aforementioned criteria. As one non-limiting example, a rule can specify that the tampered quantum channel should be torn down by instructions to the Q-SM, which can interact with the quantum nodes to carry out the tear down action. The Q-SOC can then configure a new quantum channel between the quantum nodes.

In some embodiments, the SDN can store the tampering monitoring statistics in a record. The record can include historical tampering monitoring statistics. The historical tampering monitoring statistics can include a tampering count indicative of a number of times a fiber optic has been subject to tampering, a location indicative of where in the fiber optic network tampering has occurred, and an identifier for each of the plurality of quantum channels that has been subject to tampering.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
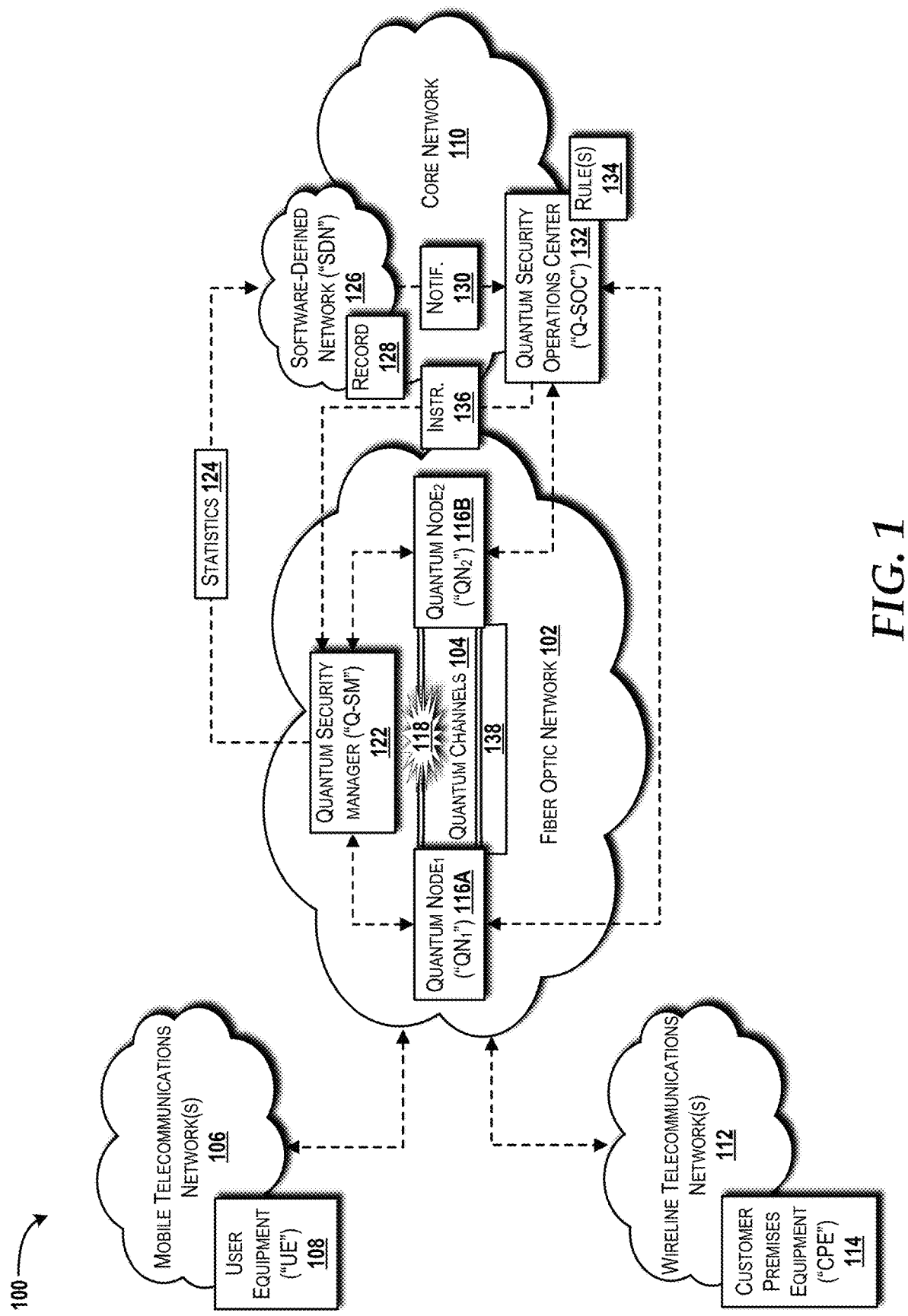
FIG. 1 is a block diagram of an operating environment in which aspects of the concepts and technologies disclosed herein can be implemented, according to an illustrative embodiment.

The concepts and technologies disclosed herein provide a method of proactively detecting a security threat by leveraging an existing quantum seal tampering detection technique (e.g., "Tamper-Indicating Quantum Seal" mentioned above) to enable any quantum operations center, including quantum security operations center ("Q-SOC"), in a large distributed system or inter-domain environment for end-to-end secure communication to take auto-corrective, proactive, and predictive action upon detecting any communication data tampering, such as 5G deep fiber communication tampering. The disclosed solution provides a quantum-enabled implementation architecture. Detecting tampering by leveraging a quantum seal currently exists and offers the ability to detect an intercept-resend attack using quantum integrity verification. This detection tampering technique does not, however, provide any threat mitigation solution upon the tampering detection. It has been shown how quantum entangled photons can be used to monitor the integrity of a fiber-optic cable—that is, the entangled photons serve as active sensing elements whose non-local correlations indicate normal seal operation. It has been proved using the quantum no-cloning theorem that attacks against the quantum seal necessarily disturb its state and that these disturbances are immediately detected. The concepts and technologies disclosed herein build upon this quantum seal detection approach for managing and mitigating the detected threat.

Technical means for both identifying when tampering occurs and acting upon the detected threat tampering data are a critical part of many containment and surveillance technologies. Thus, the proposed solution implements existing message tampering detection and provides a method of proactive auto threat management action through a Q-SOC (manual or automatic configuration) in coordination with a cloud-residing software defined network ("SDN"). A quantum optical seal using entangled photons monitors the integrity of a fiber-optic channel subject to tampering. This technique can be beneficial for the security of fiber networks, such as 5G deep fiber, that support wireless communications technologies. This application of quantum photonics can provide a basis for physical layer security in cyber-physical systems.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including hand-held devices, mobile devices, wireless devices, multiprocessor systems, distributed computing systems, microprocessor-based or programmable consumer electronics, minicomputers, mainframe computers, routers, switches, other computing devices described herein, and the like.

Turning now to FIG. 1, a block diagram illustrating an operating environment 100 in which aspects of the concepts and technologies disclosed herein can be implemented will be described, according to an illustrative embodiment. The operating environment 100 includes a fiber optic network 102 capable of supporting quantum channels 104 for the exchange of data between one or more mobile telecommunications networks 106, which serve one or more user equipment ("UE") devices 108 (shown as "UE(s) 108"), and a core network 110, and/or for the exchange of data between one or more wireline telecommunications networks 112, which serve one or more customer premises equipment ("CPE") devices 114 (shown as "CPE(s) 114"), and the core network 110.

The fiber optic network 102 can use fiber optic cables to transmit data between systems, devices, nodes (e.g., between two quantum nodes such as described herein below), networks, sub-networks, and the like using light as a carrier wave to transmit the data over optical fibers. The fiber optic network 102 can utilize principles of both classical computing and quantum computing to enable both classical and quantum data transmission.

The fiber optic network 102 can provide a backhaul network for one or more other network(s), which can be or can include one or more telecommunications networks, the Internet, one or more circuit-switched networks, one or more packet networks, combinations thereof, and the like. In the illustrated example, the fiber optic network 102 serves as a backhaul network between the mobile telecommunications network(s) 106/wireline network(s) 112 and the core network 110.

The fiber optic network 102 can include any number of sub-networks (not shown). The sub-networks can vary in the number of wavelengths per fiber pair, data rate supported, and/or optical reachability parameters. The sub-networks can be part of a multi-layer network (not shown), wherein the IP traffic of a packet-layer is carried by the underlying optical layer. The fiber optic network 102 can include any number of regenerators that are used to convert a signal from an optical signal to an electronic signal, to correct any detected errors, and then to convert the signal back to an optical signal with a better optical signal-to-noise ratio. The configuration of the regenerators can be selected based upon the needs of a given implementation. In some embodiments, the fiber optic network 102 can utilize one or more reconfigurable-optical-add-drop multiplexers ("ROADMs"), so that fewer regenerators are needed in the fiber optic network 102. The ROADMs (not shown) can be implemented, at least in part, via a software-defined network ("SDN") 126 (described below). The ROADMs, in some embodiments, are colorless and directionless, also known as CD-ROADMs. The fiber optic network 102 can be configured in numerous ways to meet the needs of different use cases. As such, additional details about the architecture of the fiber optic network 102 are not disclosed herein. It should be understood, however, that, in addition to traditional hardware-based network architectures, the fiber optic network 102 can be, can include, or can operate in communication with the SDN 126 that is controlled by one or more SDN controllers (not shown).

The fiber optic network 102 can use orthogonal frequency division multiplexing ("OFDM") as the modulation technique. It should be understood, however, that the fiber optic network 102 can use alternative or additional modulation techniques for other optical communications. As such, the fiber optic network 102 is not limited to the use of OFDM as the modulation technique.

The fiber optic network 102 can support the quantum channels 104 that can transmit quantum information in the form of qubits. In some embodiments, the quantum channels 104 can additionally transmit classical information in the form of bits. For purposes of describing the concepts and technologies disclosed herein, the quantum channels 104 will be described as transmitting information in the form of qubits such that a quantum seal tampering detection technique can be utilized.

The mobile telecommunications network 106 can operate in accordance with one or more mobile telecommunications standards including, but not limited to, Global System for Mobile communications ("GSM"), Code Division Multiple Access ("CDMA") ONE, CDMA2000, Universal Mobile Telecommunications System ("UMTS"), Long-Term Evolution, LTE, Worldwide Interoperability for Microwave Access ("WiMAX"), other current 3GPP cellular technologies, other future 3GPP cellular technologies, combinations thereof, and/or the like.

The UE device(s) 108 can be or can include any device used directly by an end-user to communicate. It can be a hand-held telephone (e.g., a smartphone), a computer equipped with a mobile telecommunications network adapter, a tablet with mobile network connectivity, a connected car, or any other mobile network-connected device. The UE device(s) 108 may include an integrated or external radio access component that facilitates wireless communication with one or more radio access networks ("RANs"; not shown) over a radio/air interface in accordance with one or more radio access technologies ("RATs"). The UE device(s) 102 may also initiate, receive, and maintain voice calls with one or more other voice-enabled telecommunications devices, such as other mobile devices or landline devices (not shown). The UE device(s) 108 may also exchange Short Message Service ("SMS") messages, Multimedia Message Service ("MMS") messages, email, and/or other messages with other devices (not shown). An example mobile device 600 that is representative of one embodiment of the UE device(s) 108 and components thereof is illustrated and described herein with reference to FIG. 6.

The core network 110 can include a 5G core network, although in some implementations the core network 110 can combine an evolved packet core ("EPC") with the 5G core network. The core network 110, in turn, can be in communication with one or more other networks (not shown), such as one or more other public land mobile networks ("PLMNs"), one or more packet data networks ("PDNs") (e.g., the Internet), combinations thereof, and/or the like. The mobile telecommunications network(s) 106 can connect to an EPC of the core network 110 via an S1 interface provided by a transport network, which can be implemented as part of the fiber optic network 102; and more specifically to a mobility management entity ("MME") via an S1-MME, and to a serving gateway ("S-GW") via an S1-U interface. The EPC of the core network 110 can include one or more MMES, one or more S-GWs (which may be combined with one or more packet gateways ("P-GWs")), and one or more home subscriber servers ("HSSs"). Although not shown individually in the illustrated example, the core network 110 can include these core network elements and may additionally include other network elements not specifically mentioned herein. In some embodiments, the core network 110 can be established based upon 3GPP standards specifications.

The core network 110 can be implemented using physical network functions ("PNFs") having hardware and software components. The core network 110 can additionally or alternatively be implemented, at least in part, by virtual network functions ("VNFs") supported by the SDN 126. For example, core network elements can be realized as VNFs that utilize a unified commercial-of-the-shelf ("COTS") hardware and flexible resources shared model with the application software for the respective core network components running on one or more virtual machines ("VMs"). Moreover, core network elements can be embodied as VNFs in one or more VNF pools, each of which can include a plurality of VNFs providing a particular core network function.

The core network 110 can additionally or alternatively include a 5G core network that can include network functions that provide functionality similar to that of the EPC network for LTE but for 5G technologies such as mmWave. For example, current 3GPP standards define a 5G core network architecture as having an access and mobility management function ("AMF") that provides mobility management functionality similar to that of an MME in an EPC network; a session management function ("SMF") that provides session management functionality similar to that of an MME and some of the S/P-GW functions, including IP address allocation, in an EPC network; an authentication server function ("AUSF") managed subscriber authentication during registration or re-registration with a 5G core network; and user plane function ("UPF") combines the user traffic transport functions previously performed by the S/P-GW in an EPC network, among others. While 3GPP has defined some of these network functions, these network functions may be split into greater granularity to perform specific functions, may be combined, and/or additional functions may be added by the time a mobile network operator deploys a live 5G network. As such, a 5G core network is intended to encompass any and all 5G core network functions that are currently defined in technical specifications currently available and revisions thereof made in the future.

The wireline network(s) 112 can include one or more wireline telephone networks, one or more wireline data networks, one or more wireline television networks, combinations thereof, and/or the like. For purposes of describing the concepts and technologies disclosed herein, the wireline network(s) 112 will be described as data network(s) that provide Internet connectivity for the CPE device(s) 114. The CPE device(s) 114 can be or can include devices such as, but not limited to, an Internet modem, router, modem/router combination, switch, antenna, satellite dish, set-top box, remote control, combinations thereof, and/or the like.

In the illustrated example, one of the quantum channels 104 has been established between a first quantum node ("QN$_1$") 116A and a second quantum node ("QN$_2$") 116B, operating as a source/transmitter and destination/receiver, respectively. Although two QNs 116 are shown, the fiber optic network 102 can include any number of QNs 116 sufficient to handle the needs of a given implementation. As such, the illustrated example should not be construed as being limiting in any way. The QNs 116 can each include one or more quantum processors capable of processing quantum data exchanged via the quantum channel(s) 104. It should be understood that although the quantum physics concepts upon which quantum computing is based have been around for many decades, quantum computing as a viable technology is still immature. Thus, the QNs 116 will likely undergo significant changes as scientists better understand how to improve quantum computing technologies. However, the core concept of the QNs 116 being capable of processing quantum data exchanged via the quantum channel(s) 104 is unlikely to change.

In the illustrated example, one of the quantum channels 104 has been tampered with by a hacker or other malicious entity and has been compromised (shown as tampered quantum channel 118). A quantum security manager ("Q-SM") 122 can continuously monitor the quantum channels 104 for tampering via a tampering detection technique. An existing tampering detection technique will now be described in brief. Under normal operation, a quantum seal transmits polarization-entangled states through active and reference fibers and the best separable approximation ("BSA") measurements yield an estimate for the entanglement parameter E. When the estimate Ex exceeds the bound of ½, then the quantum seal confirms that the received photon pairs are entangled. This use of quantum integrity verification certifies that the seal is untampered. Moreover, the presence of entanglement is doubly indicative, as it confirms that the photon injected into the active fiber is both the same photon retrieved from the active fiber and that the path length difference between the reference and active fiber links is much smaller than the single-photon coherence length. By contrast, quantum integrity verification fails when the estimate Ex lies below the threshold value of ½. This occurs in the presence of tampering due to either a temporal shift in the photon time-of-arrival or a loss of entanglement between the photons from the intercept-resend attack. However, verification may also fail because of technical noise during transmission and measurement (e.g., decoherence of the entangled state). Therefore it is necessary to quantify the probability to accurately detect tampering as well as the rate at which detection fails.

The Q-SM 122 can provide tampering monitoring statistics 124 (shown as "statistics 124") to the SDN 126 operating in the core network 110. In the illustrated example, the SDN 126 can maintain a record 128 of the tampering monitoring statistics 124, which can be used to predict future tampering efforts by hackers. The record 128 can store the tampering monitoring statistics 124 over time to build and maintain a historical record of tampering on the fiber optic network 102 as historical tampering monitoring statistics. The historical tampering monitoring statistics can include a tampering count indicative of a number of times the fiber optic network 102 has been subject to tampering, a location indicative of where in the fiber optic network 102 tampering has occurred, and an identifier for each of the quantum channels 104 that has been subject to tampering. Other tampering monitoring statistics are contemplated and may be used depending upon the requirements of a given implementation of the concepts and technologies disclosed herein. As such, the aforementioned tampering monitoring statistics (i.e., both the tampering monitoring statistics 124 and historical tampering monitoring statistics) should not be construed as being limiting in any way.

Upon receiving the tampering monitoring statistics 124, the SDN 126 can generate a notification 130 (shown as "notif. 130") directed to a quantum security operations center ("Q-SOC") 132. The notification 130 can identify the tampered quantum channel 118, including identification of the quantum nodes involved (i.e., the $QN_1$ 116A and the $QN_2$ 116B), the type of tampering (if known), the location of the tampering, the type of data potentially compromised, and/or any other information that can be used to identify the tampered quantum channel 118 and/or the circumstances surrounding the tampering. The type of tampering can be eavesdropping, transport related glitches, or transport failure in the native fiber channel of 5G deep fiber, for example. Denial of service ("DoS"), where the fiber is interrupted, or some kind of electromagnetic burst event that has occurred also can be evidence of tampering. Other attacks such as a reflection attack may be indicative of tampering.

The Q-SOC 132 can employ one or more rules 134 to determine one or more actions to be taken to respond to the tampering. The rules 134 can be specific to one or more of the quantum channels 104. The rules 134 can be specific to one or more of the QNs 116. The rules 134 can be specific to a time of day, a location, a data type, a type of tampering, or the like. The rules 134 may consider any combination of the aforementioned criteria. The rules 134 can define a mitigation plan. As one non-limiting example, a rule 134 can specify that the tampered quantum channel 118 should be torn down by instructions to the Q-SM 122, which can interact with the QNs 116 to carry out the tear down action. As another example, a rule 134 can specify that any user traffic on the tampered quantum channel 118 should be suspended and only allow security traffic while resolution is in progress.

The Q-SOC 132 can generate threat mitigation instructions 136 (shown as "instr. 136") directed to the Q-SM 122. The threat mitigation instructions 136 may be default instructions or may be defined based upon one or more of the rules 134. The Q-SOC 132 can provide the Q-SM 122 with the threat mitigation instructions 136. The Q-SM 122 can process the threat mitigation instructions 136 and take action accordingly. For example, the Q-SM 122 may receive the threat mitigation instructions 136, which instruct the Q-SM 122 to tear down the tampered quantum channel 118. The Q-SM 122, in turn, can interact with the QNs 116 to carry out the tear down action. The Q-SOC 132 can directly configure a new quantum channel 138 between the $QN_1$ 116A and the $QN_2$ 116B.

The SDN 126 can be used to create intelligent networks that are programmable, application aware, and more open than traditional hardware-based network architectures. The SDN 126 can provide an agile and cost-effective communications platform for handling the dramatic increase in data traffic on networks by providing a high degree of scalability, security, and flexibility. The SDN 126 can allow for the creation of multiple virtual network control planes on common hardware, such as at least a portion of the physical resources described below with reference to a cloud environment 400 shown in FIG. 4. The SDN 126 can help extend service virtualization and software control into many existing network elements. The SDN 126 enables applications to request and manipulate services provided by other networks (e.g., the core network 110) and to allow the other networks to expose network states back to the applications. The SDN 126 can expose network capabilities through application programming interfaces ("APIs"), making the control of network equipment remotely accessible and modifiable via third-party software clients using open protocols such as OpenFlow, available from Open Network Forum ("ONF").

The SDN 126 can include a network data plane that is responsible for bearing data traffic. The SDN data plane can include SDN elements such as switches, routers, gateways, storage, the like, or any combination thereof. The SDN 126 also can include a control plane that is responsible for controlling elements of the network data plane. The SDN control plane can include logically centralized network entities that perform operations, including translating an intent of one or more SDN applications operating within an application plane to rules and action sets that are useable by the SDN elements operating within the SDN data plane. The rules can include criterion such as, for example, switch port, virtual local area network identifier ("VLAN ID"), VLAN priority code point ("PCP"), media access control ("MAC") source address, MAC destination address, Ethernet type, IP source address, IP destination address, IP type of service ("ToS"), IP Protocol, source port, and destination port. The rules can be matched to one or more actions such as, for example, an action to forward traffic to one or more ports, an action to drop one or more packets, an action to encapsulate one or more packets and forward to a controller, an action to send one or more packets to a normal processing pipeline, and an action to modify one or more fields of one or more packets. Those skilled in the art will appreciate the breadth of possible rule and action sets utilized in a particular implementation to achieve desired results. As such, the aforementioned examples should not be construed as being limiting in any way.

The SDN 126 can include an application data plane that is responsible for providing one or more SDN applications. The SDN applications are programs that can explicitly, directly, and programmatically communicate network requirements/intents and desired network behavior to the SDN controllers.

Figure 2:
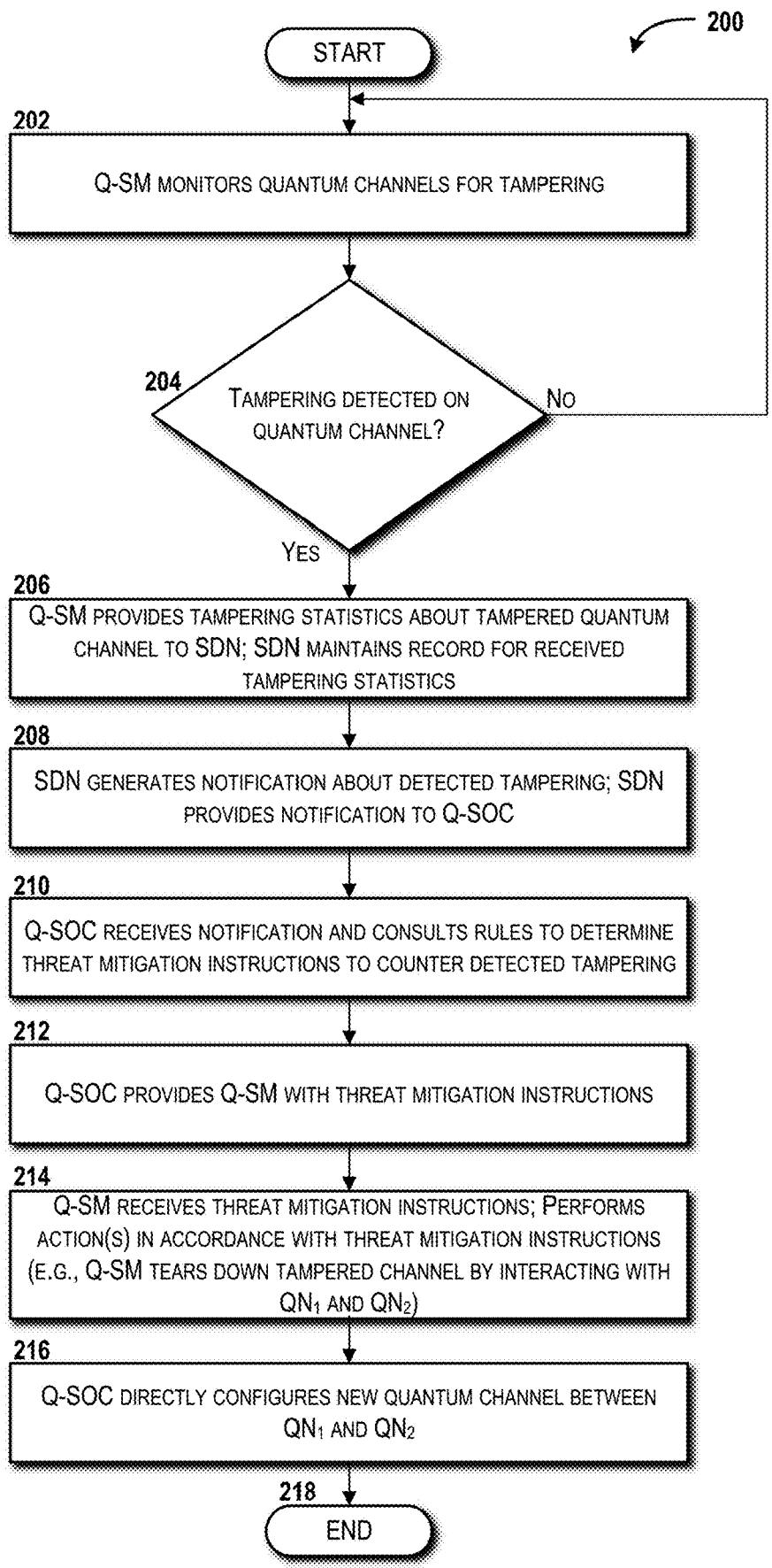
FIG. 2 is a flow diagram illustrating aspects of a method for managing a quantum tampering threat, according to an illustrative embodiment of the concepts and technologies disclosed herein.

Turning now to FIG. 2, aspects of a method 200 for managing a quantum tampering threat will be described, according to an illustrative embodiment of the concepts and technologies disclosed herein. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, servers, routers, switches, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor or other processing component(s) disclosed herein to perform operations. It should be understood that the performance of one or more operations may include operations executed by one or more virtual processors at the instructions of one or more of the aforementioned hardware processors.

The method 200 begins and proceeds to operation 202. At operation 202, the Q-SM 122 monitors the quantum channels 104 for tampering. From operation 202, the method 200 proceeds to operation 204. At operation 204, the Q-SM 122 checks if tampering is detected on at least one of the quantum channels 104. If no tampering is detected, the method 200 returns to operation 202 and the Q-SM 122 continues to monitor the quantum channels 104 for tampering, and then operation 204 repeats. If, however, tampering is detected at operation 204, the method 200 proceeds to operation 206.

At operation 206, the Q-SM 122 provides the tampering monitoring statistics 124 about the tampered quantum channel 118 to the SDN 126. The SDN 126 stores the tampering monitoring statistics 124 in the record 128. From operation 206, the method 200 proceeds to operation 208. At operation 208, the SDN 126 generates the notification 130 about the detected tampering and provides the notification 130 to the Q-SOC 132. From operation 208, the method 200 proceeds to operation 210. At operation 210, the Q-SOC 132 receives the notification 130 and consults the rules 134 to determine the threat mitigation instructions 136 to counter the detected tampering. From operation 210, the method 200 proceeds to operation 212. At operation 212, the Q-SOC 132 provides the Q-SM 122 with the threat mitigation instructions 136.

From operation 212, the method 200 proceeds to operation 214. At operation 214, the Q-SM 122 receives the threat mitigation instructions 136. Also at operation 214, the Q-SM 122 performs one or more actions in accordance with the threat mitigation instructions 136. For example, the Q-SM 122 may tear down the tampered quantum channel 118 by interacting with the QNs 116. From operation 214, the method 200 proceeds to operation 216. At operation 216, the Q-SOC 132 directly configures the new quantum channel between the QN$_1$ 116A and the QN$_2$ 116B.

From operation 216, the method 200 proceeds to operation 218. The method 200 can end at operation 218.

Figure 3:
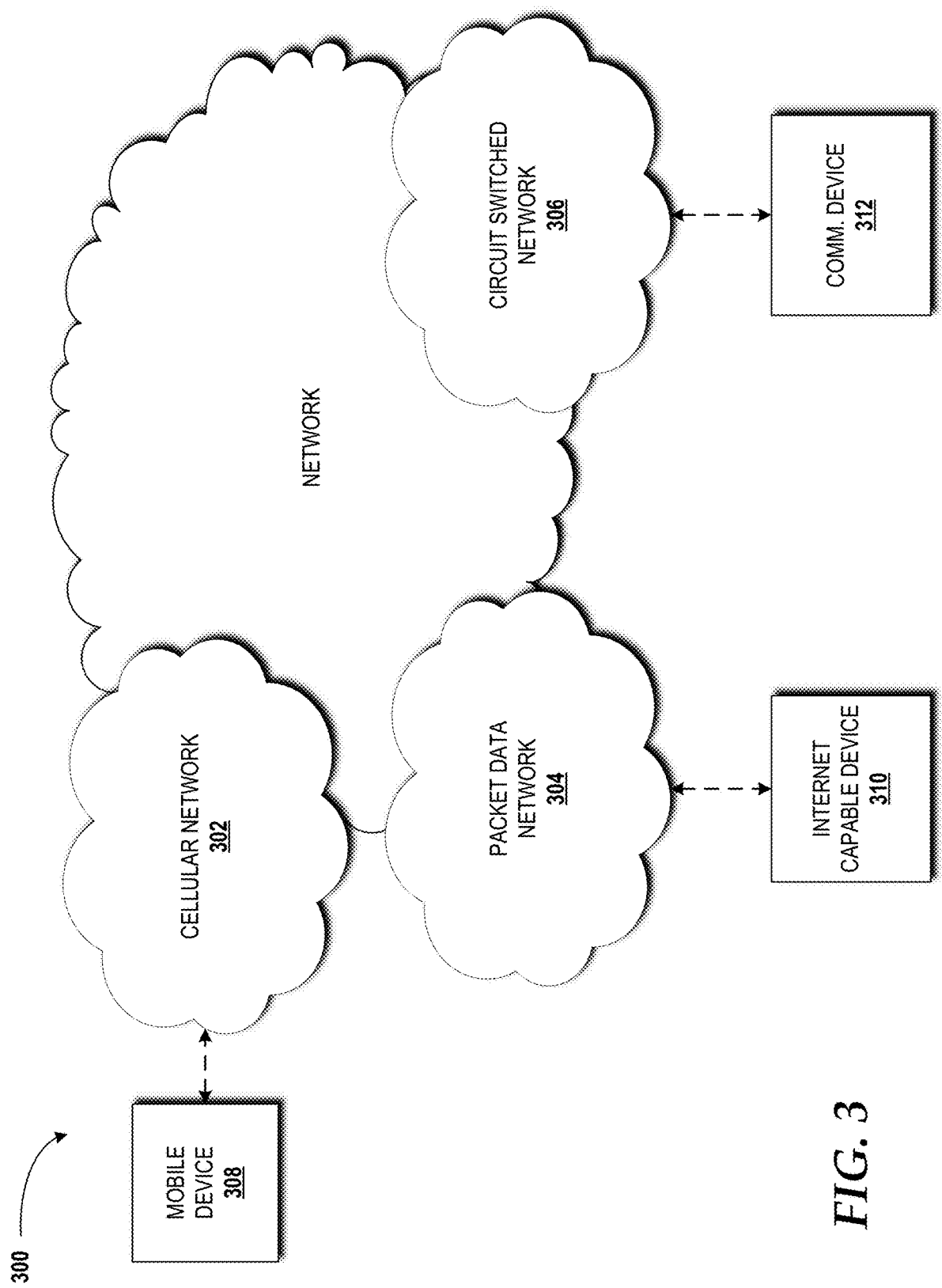
FIG. 3 is a diagram illustrating a network, according to an illustrative embodiment.

Turning now to FIG. 3, details of a network 300 are illustrated, according to an illustrative embodiment. The network 300 includes a cellular network 302 (e.g., the mobile telecommunications network 106), a packet data network 304, for example, the Internet, and a circuit switched network 306, for example, a PSTN. The cellular network 302 includes various components such as, but not limited to, base transceiver stations ("BTSs"), Node-Bs, eNodeBs, gNodeBs, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, general packet radio service ("GPRS") core network components, location service nodes, an IP Multimedia Subsystem ("IMS"), and the like. The cellular network 302 also includes radios and nodes for receiving and transmitting voice, data, and combinations thereof to and from radio transceivers, networks, the packet data network 304, and the circuit switched network 306.

A mobile communications device 308, such as, for example, the UE device(s) 108, a cellular telephone, a user equipment, a mobile terminal, a PDA, a laptop computer, a handheld computer, and combinations thereof, can be operatively connected to the cellular network 302. The cellular network 302 can be configured as a 2G GSM network and can provide data communications via GPRS and/or EDGE. Additionally, or alternatively, the cellular network 302 can be configured as a 3G UMTS network and can provide data communications via the HSPA protocol family, for example, HSDPA, EUL (also referred to as HSUPA), and HSPA+. The cellular network 302 also is compatible with 4G mobile communications standards such as LTE, or the like, as well as evolved mobile standards such as 5G and future iterations thereof.

The packet data network 304 includes various devices, for example, servers, computers, databases, and other devices in communication with one another, as is generally known. The packet data network 304 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 304 includes or is in communication with the Internet. The circuit switched network 306 includes various hardware and software for providing circuit switched communications. The circuit switched network 306 may include, or may be, what is often referred to as a POTS. The functionality of a circuit switched network 306 or other circuit-switched network are generally known and will not be described herein in detail.

The illustrated cellular network 302 is shown in communication with the packet data network 304 and a circuit switched network 306, though it should be appreciated that this is not necessarily the case. One or more Internet-capable devices 310, for example, the CPE device(s) 114, a PC, a laptop, a portable device, or another suitable device, can communicate with one or more cellular networks 302, and devices connected thereto, through the packet data network 304. It also should be appreciated that the Internet-capable device 310 can communicate with the packet data network 304 through the circuit switched network 306, the cellular network 302, and/or via other networks (not illustrated).

As illustrated, a communications device 312, for example, a telephone, facsimile machine, modem, computer, or the like, can be in communication with the circuit switched network 306, and therethrough to the packet data network 304 and/or the cellular network 302. It should be appreciated that the communications device 312 can be an Internet-capable device, and can be substantially similar to the Internet-capable device 310.

Figure 4:
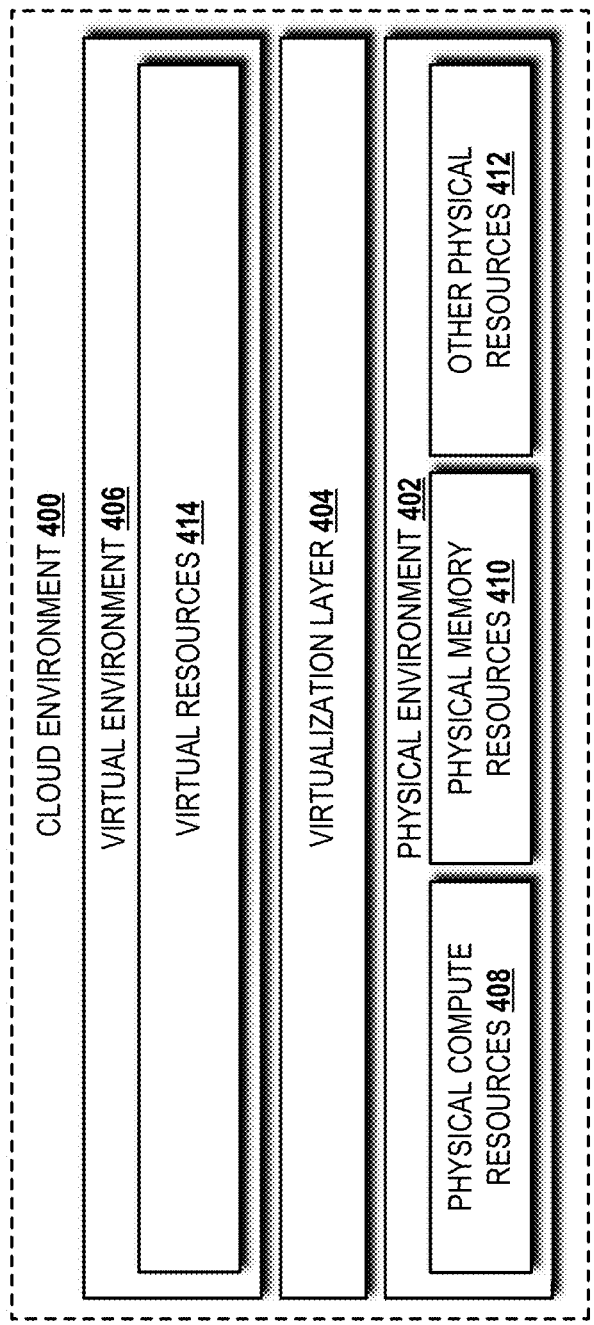
FIG. 4 is a block diagram illustrating an example cloud environment capable of implementing aspects of the embodiments presented herein.

Turning now to FIG. 4, an illustrative cloud environment 400 will be described, according to an illustrative embodiment. In some embodiments, the SDN 126 can be implemented, at least in part, in the cloud environment 400. The cloud environment 400 includes a physical environment 402, a virtualization layer 404, and a virtual environment 406. While no connections are shown in FIG. 4, it should be understood that some, none, or all of the components illustrated in FIG. 4 can be configured to interact with one other to carry out various functions described herein. In some embodiments, the components are arranged so as to communicate via one or more networks, such as the fiber optic network 102 and the core network 110. Thus, it should be understood that FIG. 4 and the remaining description are intended to provide a general understanding of a suitable environment in which various aspects of the embodiments described herein can be implemented, and should not be construed as being limiting in any way.

The physical environment 402 provides hardware resources, which, in the illustrated embodiment, include one or more physical compute resources 408, one or more physical memory resources 410, and one or more other physical resources 412. The physical compute resource(s) 408 can include one or more hardware components that perform computations to process data and/or to execute computer-executable instructions of one or more application programs, one or more operating systems, and/or other software.

The physical compute resources 408 can include one or more central processing units ("CPUs") configured with one or more processing cores. The physical compute resources 408 can include one or more graphics processing unit ("GPU") configured to accelerate operations performed by one or more CPUs, and/or to perform computations to process data, and/or to execute computer-executable instructions of one or more application programs, one or more operating systems, and/or other software that may or may not include instructions particular to graphics computations. In some embodiments, the physical compute resources 408 can include one or more discrete GPUs. In some other embodiments, the physical compute resources 408 can include CPU and GPU components that are configured in accordance with a co-processing CPU/GPU computing model, wherein the sequential part of an application executes on the CPU and the computationally-intensive part is accelerated by the GPU processing capabilities. The physical compute resources 408 can include one or more system-on-chip ("SoC") components along with one or more other components, including, for example, one or more of the physical memory resources 410, and/or one or more of the other physical resources 412. In some embodiments, the physical compute resources 408 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The physical compute resources 408 can be or can include one or more hardware components architected in accordance with an ARM architecture, available for license from ARM HOLDINGS of Cambridge, United Kingdom. Alternatively, the physical compute resources 408 can be or can include one or more hardware components architected in accordance with an x86 architecture, such an architecture available from INTEL CORPORATION of Mountain View, Calif., and others. Those skilled in the art will appreciate the implementation of the physical compute resources 408 can utilize various computation architectures, and as such, the physical compute resources 408 should not be construed as being limited to any particular computation architecture or combination of computation architectures, including those explicitly disclosed herein.

The physical memory resource(s) 410 can include one or more hardware components that perform storage/memory operations, including temporary or permanent storage operations. In some embodiments, the physical memory resource(s) 410 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the physical compute resources 408.

The other physical resource(s) 412 can include any other hardware resources that can be utilized by the physical compute resources(s) 408 and/or the physical memory resource(s) 410 to perform operations described herein. The other physical resource(s) 412 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The physical resources operating within the physical environment 402 can be virtualized by one or more virtual machine monitors (not shown; also known as "hypervisors") operating within the virtualization/control layer 404 to create virtual resources 414 that reside in the virtual environment 406. The virtual machine monitors can be or can include software, firmware, and/or hardware that alone or in combination with other software, firmware, and/or hardware, creates and manages virtual resources operating within the virtual environment 406.

The virtual resources 414 operating within the virtual environment 406 can include abstractions of at least a portion of the physical compute resources 408, the physical memory resources 410, and/or the other physical resources 412, or any combination thereof. In some embodiments, the abstractions can include one or more virtual machines upon which one or more applications can be executed.

Figure 5:
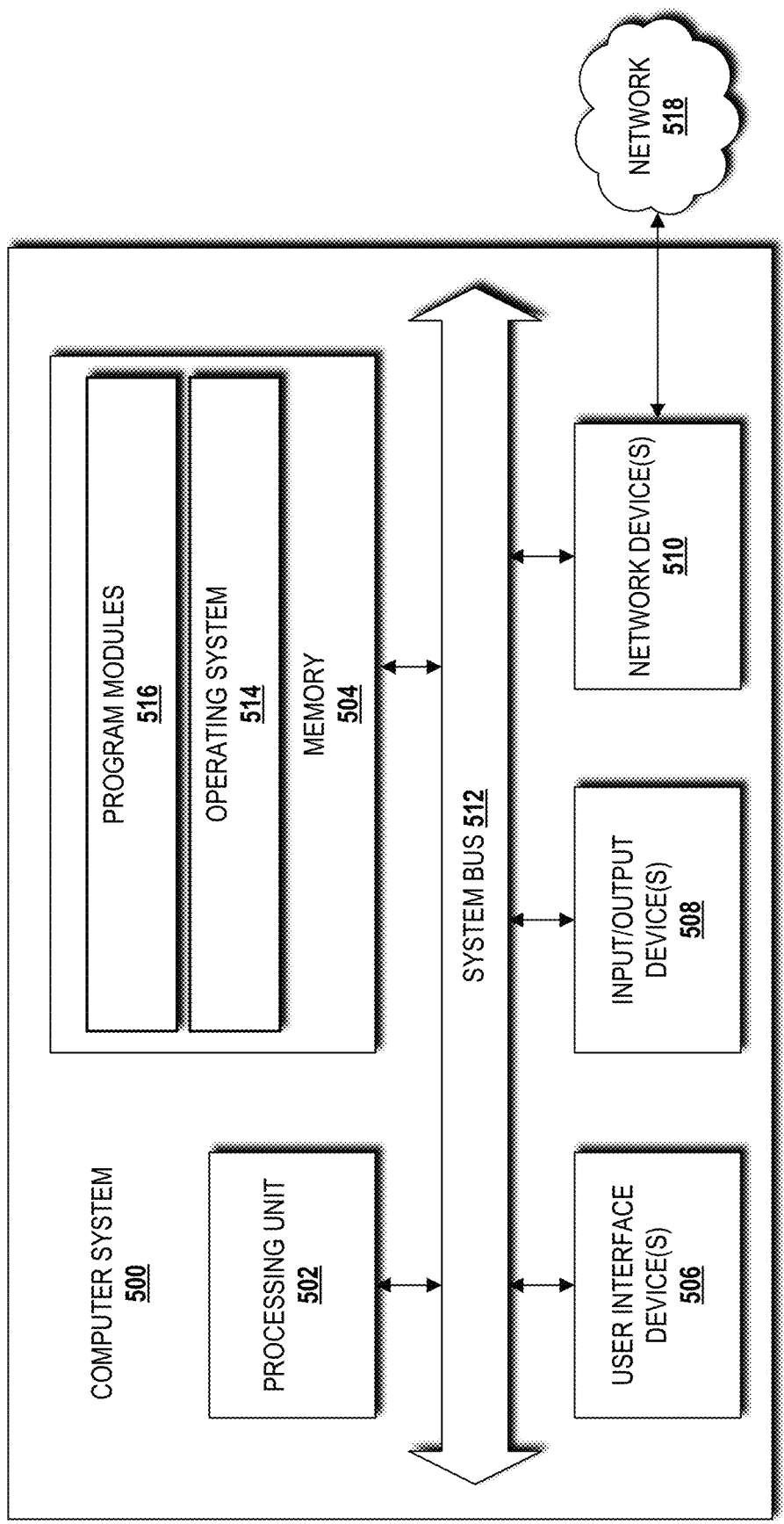
FIG. 5 is a block diagram illustrating an example computer system capable of implementing aspects of the embodiments presented herein.

FIG. 5 is a block diagram illustrating a computer system 500 configured to provide the functionality in accordance with various embodiments of the concepts and technologies disclosed herein. In some embodiments, the CPE device(s) 114, the Q-SM 122, the Q-SOC 132, and/or other systems and devices described herein can be configured, at least in part, like the architecture of the computer system 500. It should be understood, however, that modification to the architecture may be made to facilitate certain interactions among elements described herein.

The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 504 communicates with the processing unit 502 via the system bus 512. In some embodiments, the memory 504 is operatively connected to a memory controller (not shown) that enables communication with the processing unit 502 via the system bus 512. The illustrated memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 516 may include various software and/or program modules to perform the various operations described herein. The program modules 516 and/or other programs can be embodied in computer-readable media containing instructions that, when executed by the processing unit 502, perform various operations such as those described herein. According to embodiments, the program modules 516 may be embodied in hardware, software, firmware, or any combination thereof.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium," "computer-readable storage medium," and variations thereof does not include waves or signals per se and/or communication media, and therefore should be construed as being directed to "non-transitory" media only.

The user interface devices 506 may include one or more devices with which a user accesses the computer system 500. The user interface devices 506 may include, but are not limited to, computers, servers, PDAs, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer. In some embodiments, the I/O devices 508 can be used for manual controls for operations to exercise under certain emergency situations.

The network devices 510 enable the computer system 500 to communicate with other networks or remote systems via a network 518, which can be or can include the network 302. Examples of the network devices 510 include, but are not limited to, a modem, a radio frequency ("RF") or infrared ("IR") transceiver, a telephonic interface, a bridge, a router, or a network card. The network 518 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 518 may be a wired network such as, but not limited to, a Wide Area Network ("WAN"), a wired Personal Area Network ("PAN"), or a wired Metropolitan Area Network ("MAN"). The network 518 may be any other network described herein.

Figure 6:
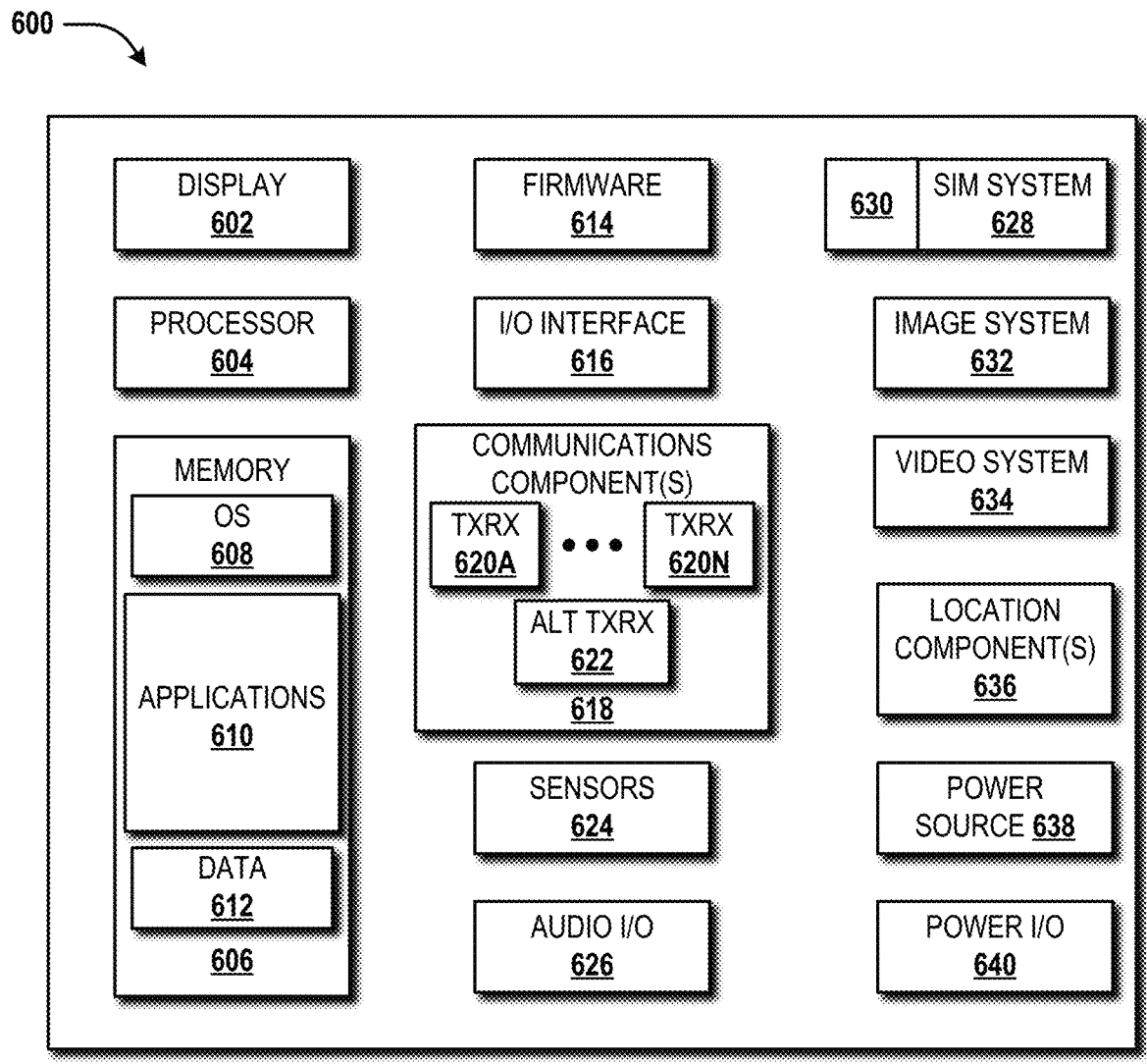
FIG. 6 is a block diagram illustrating an example mobile device capable of implementing aspects of the embodiments disclosed herein.

Turning now to FIG. 6, an illustrative mobile device 600 and components thereof will be described. In some embodiments, the UE device(s) 108 is/are configured the same as or similar to the mobile device 600. While connections are not shown between the various components illustrated in FIG. 6, it should be understood that some, none, or all of the components illustrated in FIG. 6 can be configured to interact with one other to carry out various device functions. In some embodiments, the components are arranged so as to communicate via one or more busses (not shown). Thus, it should be understood that FIG. 6 and the following description are intended to provide a general understanding of a suitable environment in which various aspects of embodiments can be implemented, and should not be construed as being limiting in any way.

As illustrated in FIG. 6, the mobile device 600 can include a display 602 for displaying data. According to various embodiments, the display 602 can be configured to display various GUI elements, text, images, video, virtual keypads and/or keyboards, messaging data, notification messages, metadata, internet content, device status, time, date, calendar data, device preferences, map and location data, combinations thereof, and/or the like. The mobile device 600 also can include a processor 604 and a memory or other data storage device ("memory") 606. The processor 604 can be configured to process data and/or can execute computer-executable instructions stored in the memory 606. The computer-executable instructions executed by the processor 604 can include, for example, an operating system 608, one or more applications 610, other computer-executable instructions stored in a memory 606, or the like. In some embodiments, the applications 610 also can include a user interface ("UP") application (not illustrated in FIG. 6).

The UI application can interface with the operating system 608 to facilitate user interaction with functionality and/or data stored at the mobile device 600 and/or stored elsewhere. In some embodiments, the operating system 608 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 604 to aid a user in dialing telephone numbers, entering content, viewing account information, answering/initiating calls, entering/deleting data, entering and setting user IDs and passwords for device access, configuring settings, manipulating address book content and/or settings, multimode interaction, interacting with other applications 610, and otherwise facilitating user interaction with the operating system 608, the applications 610, and/or other types or instances of data 612 that can be stored at the mobile device 600. According to various embodiments, the data 612 can include, for example, telephone dialer applications, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 610, the data 612, and/or portions thereof can be stored in the memory 606 and/or in a firmware 614, and can be executed by the processor 604. The firmware 614 also can store code for execution during device power up and power down operations. It can be appreciated that the firmware 614 can be stored in a volatile or non-volatile data storage device including, but not limited to, the memory 606 and/or a portion thereof.

The mobile device 600 also can include an input/output ("I/O") interface 616. The I/O interface 616 can be configured to support the input/output of data such as location information, user information, organization information, presence status information, user IDs, passwords, and application initiation (start-up) requests. In some embodiments, the I/O interface 616 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 600 can be configured to synchronize with another device to transfer content to and/or from the mobile device 600. In some embodiments, the mobile device 600 can be configured to receive updates to one or more of the applications 610 via the I/O interface 616, though this is not necessarily the case. In some embodiments, the I/O interface 616 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 616 may be used for communications between the mobile device 600 and a network device or local device.

The mobile device 600 also can include a communications component 618. The communications component 618 can be configured to interface with the processor 604 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 618 includes a multimode communications subsystem for facilitating communications via the cellular network and one or more other networks.

The communications component 618, in some embodiments, includes one or more transceivers. The one or more transceivers, if included, can be configured to communicate over the same and/or different wireless technology standards with respect to one another. For example, in some embodiments one or more of the transceivers of the communications component 618 may be configured to communicate using GSM, CDMA ONE, CDMA2000, LTE, and various other 2G, 2.5G, 3G, 4G, 5G, and greater generation technology standards. Moreover, the communications component 618 may facilitate communications over various channel access methods (which may or may not be used by the aforementioned standards) including, but not limited to, TDMA, FDMA, W-CDMA, OFDM, SDMA, and the like.

In addition, the communications component 618 may facilitate data communications using GPRS, EDGE, HSPA protocol family including HSDPA, EUL or otherwise termed HSUPA, HSPA+, and various other current and future wireless data access standards. In the illustrated embodiment, the communications component 618 can include a first transceiver ("TxRx") 620A that can operate in a first communications mode (e.g., GSM). The communications component 618 also can include an $N^{th}$ transceiver ("TxRx") 620N that can operate in a second communications mode relative to the first transceiver 620A (e.g., UMTS). While two transceivers 620A-620N (hereinafter collectively and/or generically referred to as "transceivers 620") are shown in FIG. 6, it should be appreciated that less than two, two, and/or more than two transceivers 620 can be included in the communications component 618.

The communications component 618 also can include an alternative transceiver ("Alt TxRx") 622 for supporting other types and/or standards of communications. According to various contemplated embodiments, the alternative transceiver 622 can communicate using various communications technologies such as, for example, WI-FI, WIMAX, BLUETOOTH, infrared, infrared data association ("IRDA"), near-field communications ("NFC"), other radio frequency ("RF") technologies, combinations thereof, and the like.

In some embodiments, the communications component 618 also can facilitate reception from terrestrial radio networks, digital satellite radio networks, internet-based radio service networks, combinations thereof, and the like. The communications component 618 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 600 also can include one or more sensors 624. The sensors 624 can include temperature sensors, light sensors, air quality sensors, movement sensors, orientation sensors, noise sensors, proximity sensors, or the like. As such, it should be understood that the sensors 624 can include, but are not limited to, accelerometers, magnetometers, gyroscopes, infrared sensors, noise sensors, microphones, combinations thereof, or the like. Additionally, audio capabilities for the mobile device 600 may be provided by an audio I/O component 626. The audio I/O component 626 of the mobile device 600 can include one or more speakers for the output of audio signals, one or more microphones for the collection and/or input of audio signals, and/or other audio input and/or output devices.

The illustrated mobile device 600 also can include a subscriber identity module ("SIM") system 628. The SIM system 628 can include a universal SIM ("USIM"), a universal integrated circuit card ("UICC") and/or other identity devices. The SIM system 628 can include and/or can be connected to or inserted into an interface such as a slot interface 630. In some embodiments, the slot interface 630 can be configured to accept insertion of other identity cards or modules for accessing various types of networks. Additionally, or alternatively, the slot interface 630 can be configured to accept multiple subscriber identity cards. Because other devices and/or modules for identifying users and/or the mobile device 600 are contemplated, it should be understood that these embodiments are illustrative, and should not be construed as being limiting in any way.

The mobile device 600 also can include an image capture and processing system 632 ("image system"). The image system 632 can be configured to capture or otherwise obtain photos, videos, and/or other visual information. As such, the image system 632 can include cameras, lenses, charge-coupled devices ("CCDs"), combinations thereof, or the like. The mobile device 600 may also include a video system 634. The video system 634 can be configured to capture, process, record, modify, and/or store video content. Photos and videos obtained using the image system 632 and the video system 634, respectively, may be added as message content to a multimedia message service ("MMS") message, email message, and sent to another mobile device. The video and/or photo content also can be shared with other devices via various types of data transfers via wired and/or wireless communication devices as described herein.

The mobile device 600 also can include one or more location components 636. The location components 636 can be configured to send and/or receive signals to determine a geographic location of the mobile device 600. According to various embodiments, the location components 636 can send and/or receive signals from GPS devices, assisted GPS ("A-GPS") devices, WI-FI/WIMAX and/or cellular network triangulation data, combinations thereof, and the like. The location component 636 also can be configured to communicate with the communications component 618 to retrieve triangulation data for determining a location of the mobile device 600. In some embodiments, the location component 636 can interface with cellular network nodes, telephone lines, satellites, location transmitters and/or beacons, wireless network transmitters and receivers, combinations thereof, and the like. In some embodiments, the location component 636 can include and/or can communicate with one or more of the sensors 624 such as a compass, an accelerometer, and/or a gyroscope to determine the orientation of the mobile device 600. Using the location component

636, the mobile device 600 can generate and/or receive data to identify its geographic location, or to transmit data used by other devices to determine the location of the mobile device 600. The location component 636 may include multiple components for determining the location and/or orientation of the mobile device 600.

The illustrated mobile device 600 also can include a power source 638. The power source 638 can include one or more batteries, power supplies, power cells, and/or other power subsystems including alternating current ("AC") and/or direct current ("DC") power devices. The power source 638 also can interface with an external power system or charging equipment via a power I/O component 640. Because the mobile device 600 can include additional and/or alternative components, the above embodiment should be understood as being illustrative of one possible operating environment for various embodiments of the concepts and technologies described herein. The described embodiment of the mobile device 600 is illustrative, and should not be construed as being limiting in any way.

Based on the foregoing, it should be appreciated that concepts and technologies directed to quantum tampering threat management have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
monitoring, by a quantum security manager operating in a fiber optic network, a plurality of quantum channels for tampering, wherein a quantum channel of the plurality of quantum channels is established between a first quantum node and a second quantum node;
detecting, by the quantum security manager, tampering on the quantum channel of the plurality of quantum channels based upon a quantum seal tampering detection technique;
providing, by the quantum security manager, tampering monitoring statistics to a software-defined network that, in turn, notifies a quantum security operations center about the tampering on the quantum channel, wherein the software-defined network and the quantum security operations center both operate in communication with a core network of a mobile telecommunications network;
receiving, by the quantum security manager, threat mitigation instructions from the quantum security operations center, wherein the threat mitigation instructions instruct the quantum security manager how to counter the tampering on the quantum channel; and
performing, by the quantum security manager, an action in accordance with the threat mitigation instructions to counter the tampering on the quantum channel.

2. The method of claim 1, further comprising:
receiving, by the quantum security operations center, a notification from the software-defined network, wherein the notification informs the quantum security operations center about the tampering on the quantum channel;
determining, by the quantum security operations center, the threat mitigation instructions to counter the tampering on the quantum channel; and
providing, by the quantum security operations center, the threat mitigation instructions to the quantum security manager.

3. The method of claim 2, wherein determining, by the quantum security operations center, the threat mitigation instructions to counter the tampering on the quantum channel comprises determining, by the quantum security operations center, based upon a rule, the threat mitigation instructions to counter the tampering on the quantum channel.

4. The method of claim 3, wherein the rule specifies that the threat mitigation instructions are to tear down the quantum channel that is subject to tampering.

5. The method of claim 4, wherein performing, by the quantum security manager, the action in accordance with the threat mitigation instructions to counter the tampering on the quantum channel comprises tearing down, by the quantum security manager, the quantum channel.

6. The method of claim 5, wherein tearing down, by the quantum security manager, the quantum channel comprises interacting with the first quantum node and the second quantum node associated with the quantum channel.

7. The method of claim 6, further comprising configuring, by the quantum security operations center, a new quantum channel between the first quantum node and the second quantum node.

8. The method of claim 1, further comprising storing, by the software-defined network, the tampering monitoring statistics in a record, wherein the record comprises historical tampering monitoring statistics, and wherein the historical tampering monitoring statistics comprise a tampering count indicative of a number of times the fiber optic network that comprises the plurality of quantum channels that have been subject to tampering, a location indicative of where in the fiber optic network tampering has occurred, and an identifier for each of the plurality of quantum channels that has been subject to tampering.

9. A system comprising:
a quantum security manager operating in a fiber optic network, the quantum security manager comprising a processor and a memory, wherein the memory stores instructions that, when executed by the processor, cause the processor to perform operations comprising
monitoring a plurality of quantum channels for tampering, wherein a quantum channel of the plurality of quantum channels is established between a first quantum node and a second quantum node;
detecting tampering on the quantum channel of the plurality of quantum channels based upon a quantum seal tampering detection technique,
providing tampering monitoring statistics to a software-defined network that, in turn, notifies a quantum security operations center about the tampering on the quantum channel, wherein the software-defined network and the quantum security operations center both operate in communication with a core network of a mobile telecommunications network,
receiving threat mitigation instructions from the quantum security operations center, wherein the threat mitigation instructions instruct the quantum security manager how to counter the tampering on the quantum channel, and performing an action in accordance with the threat mitigation instructions to counter the tampering on the quantum channel.

10. The system of claim 9, further comprising the quantum security operations center; wherein the quantum security operations center comprises a further processor and a further memory, and wherein the further memory stores further instructions that, when executed by the further processor, cause the further processor to perform further operations comprising:

receiving a notification from the software-defined network, wherein the notification informs the quantum security operations center about the tampering on the quantum channel;

determining the threat mitigation instructions to counter the tampering on the quantum channel; and providing the threat mitigation instructions to the quantum security manager.

11. The system of claim 10, wherein determining the threat mitigation instructions to counter the tampering on the quantum channel comprises determining, based upon a rule, the threat mitigation instructions to counter the tampering on the quantum channel.

12. The system of claim 11, wherein the rule specifies that the threat mitigation instructions are to tear down the quantum channel that is subject to tampering.

13. The system of claim 12, wherein performing the action in accordance with the threat mitigation instructions to counter the tampering on the quantum channel comprises tearing down the quantum channel.

14. The system of claim 13, wherein tearing down the quantum channel comprises interacting with the first quantum node and the second quantum node associated with the quantum channel.

15. The system of claim 14, wherein the further operations further comprise configuring a new quantum channel between the first quantum node and the second quantum node.

16. A computer-readable storage medium comprising computer-executable instructions that, when executed by a processor of a quantum security manager operating in a fiber optic network, cause the processor to perform operations comprising:

monitoring a plurality of quantum channels for tampering, wherein a quantum channel of the plurality of quantum channels is established between a first quantum node and a second quantum node;

detecting tampering on the quantum channel of the plurality of quantum channels based upon a quantum seal tampering detection technique;

providing tampering monitoring statistics to a software-defined network that, in turn, notifies a quantum security operations center about the tampering on the quantum channel, wherein the software-defined network and the quantum security operations center both operate in communication with a core network of a mobile telecommunications network;

receiving threat mitigation instructions from the quantum security operations center, wherein the threat mitigation instructions instruct the quantum security manager how to counter the tampering on the quantum channel; and performing an action in accordance with the threat mitigation instructions to counter the tampering on the quantum channel.

17. The computer-readable storage medium of claim 16, wherein performing the action in accordance with the threat mitigation instructions to counter the tampering on the quantum channel comprises tearing down the quantum channel by interacting with the first quantum node and the second quantum node associated with the quantum channel.

* * * * *